Figure 1:
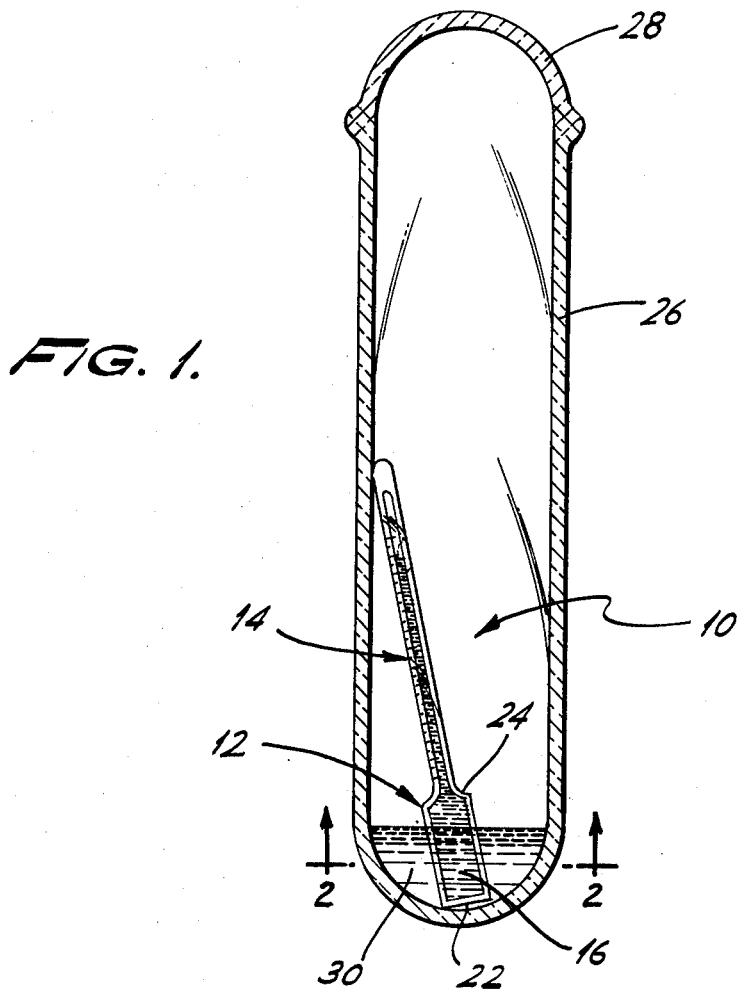

United States Patent [19]

Koehler

[11] 4,064,759
[45] Dec. 27, 1977

[54] PRESSURE MEASURING DEVICE

[76] Inventor: Charles Koehler, 184 Pebble Ridge Road, Warrington, Pa. 18976

[21] Appl. No.: 744,991

[22] Filed: Nov. 26, 1976

[51] Int. Cl.² ............................................. G01L 7/02
[52] U.S. Cl. ................................................... 73/409
[58] Field of Search ............... 73/409, 406, 73, 388 R, 73/300

[56] References Cited

U.S. PATENT DOCUMENTS

| | | | |
|---|---|---|---|
| 1,692,360 | 11/1928 | Wolcott et al. | 73/406 |
| 2,660,890 | 1/1953 | Fletcher | 73/409 |
| 2,801,538 | 8/1957 | Matson | 73/73 |
| 2,931,225 | 4/1960 | Pleuger | 73/300 |
| 3,210,159 | 10/1965 | Crane et al. | 23/252 |
| 3,871,211 | 3/1975 | Tal | 73/73 |

Primary Examiner—Donald O. Woodiel
Attorney, Agent, or Firm—Robert P. Seitter

[57] ABSTRACT

The preferred embodiment of the invention disclosed herein comprises a closed glass member including a hollow pressure-sensing portion and a hollow pressure indicating portion communicating with the pressure-sensing portion. At least one wall forming the pressure-sensing portion is deformable and the pressure-sensing portion is filled with an incompressible fluid. In use, the glass member is placed in a capsule including a medium which when pressurized deforms the deformable wall which, in turn, exerts force on the incompressible fluid causing it to flow in the pressure-indicating portion. The level of the incompressible fluid in the pressure-indicating portion is indicative of the pressure in the medium.

9 Claims, 2 Drawing Figures

PRESSURE MEASURING DEVICE

This invention relates to a measuring device and more particularly to a pressure-measuring device.

In various circumstances it is desirable to measure the pressure of an essentially isolated medium in a sealed container. For example, in laboratory testing it is usual to perform tests on a combination of chemical compositions to determine how the compositions react with one another over an extended period of time. In conducting the tests, the compositions are placed in a sealed glass capsule which can be placed in an oven at elevated temperature for a period of several months and observed to discern chemical reactions. With certain of these tests, the chemical reaction causes a substantial pressure build-up within the capsule which could cause it to burst when it is handled. Since the capsule is usually made of glass, laboratory personnel can be seriously injured by the glass fragments when it bursts.

It should be understood that it is desirable to provide some type of pressure-measuring device in the sealed glass capsule to determine the pressure within the capsule and provide an indication thereof so that laboratory personnel will be forewarned of high pressure within the capsule. To minimize inaccuracies introduced into the test procedure, the pressure-measuring device should be made of a relatively inert material so as not to react with the chemical compositions and should be capable of being sealed in the capsule so that no leaky connections are provided. Of course, the pressure-measuring device should also be relatively simple and inexpensive.

It is an object of this invention, therefore, to provide a pressure-measuring device that is particularly adapted for use in laboratory testing procedures.

It is another object of this invention to provide a pressure-measuring device that is made of an inert material and that can be sealed within a test capsule without reacting with chemical compositions in the capsule.

It is yet another object of this invention to provide a pressure-measuring device that is useful to measure pressure of a generally isolated medium and that is relatively inexpensive.

These and other objects of this invention are accomplished by providing a pressure-measuring device comprising a closed member made of glass or a similar inert material and having a hollow pressure-sensing portion and a hollow pressure indicating portion communicating with the pressure-sensing portion. The pressure-sensing portion includes a deformable wall and is substantially filled with an incompressible fluid. In use, the pressure-measuring device can be placed in a sealed capsule with chemical compositions so that when the compositions exert pressure on the deformable wall of the pressure-sensing portion that wall deforms exerting a force on the incompressible fluid causing the fluid to flow into the pressure-indicating portion to provide an indication of the pressure of the compositions within the capsule.

Preferably, the pressure-sensing portion is in the form of a generally hollow rectangular container and includes a first pair of opposite walls having a width significantly greater than the width of a second pair of opposite walls whereby the pressure of the compositions within the capsule is operative to significantly deform the first pair of opposite walls. The pressure indicating portion is preferably in the form of a hollow rod and can include indicia along its length corresponding to increments of pressure. If desired the incompressible fluid may be colored to facilitate reading the pressure.

Figure 2:
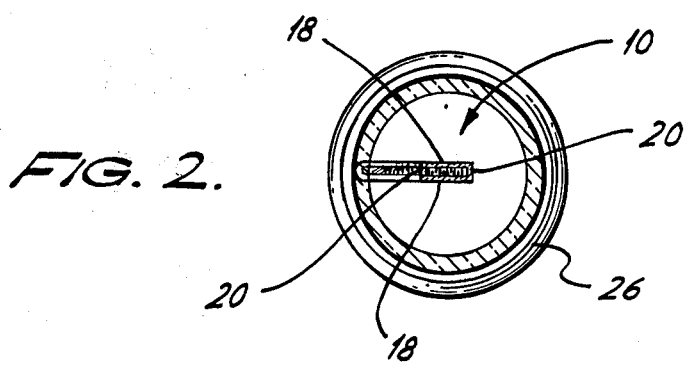

For a better understanding of the invention, reference is made to the following description of a preferred embodiment thereof, taken in conjunction with the figures of the accompanying drawing, in which:

FIG. 1 is a front elevation view of a sealed capsule in which a pressure-measuring device in accordance with this invention is sealed; and, FIG. 2 is a cross-sectional view taken generally along the line 2—2 of FIG. 1.

Referring now to the drawing, there is disclosed a pressure-measuring device 10 in accordance with this invention. The pressure-measuring device 10 is made entirely of an inert material, preferably, glass, so as not to react with chemical compositions in which it is placed in contact. Included is a pressure-sensing portion 12 and a pressure-indicating portion 14 which is in communication with the pressure-sensing portion. Within the pressure-sensing portion 12 there is carried an incompressible fluid 16 which can be any suitable liquid. For example, it is believed that mercury, alcohol or mixtures of alcohol with other liquids including a suitable coloring dye, the purpose of which will be explained hereinafter, can be conveniently used in carrying out the principles in accordance with this invention.

The pressure-sensing portion 12 of the pressure-measuring device 10 includes at least one deformable wall which can be deformed by the pressure of a medium the pressure of which it is desired to determine. Preferably, the pressure-sensing portion 12 is a generally rectangular container having a first pair of generally deformable walls 18,18 and a second pair of walls 20,20 which span between the first pair of walls. Thus, the walls 18,18 are opposite each other and the walls 20,20 are opposite each other. Bottom and top walls 22 and 24, respectively, are also provided to close the pressure-sensing portion 12. As clearly illustrated in FIG. 2 of the drawing, the first pair of deformable walls 18,18 has a width which is significantly greater than the width of the second pair of walls 20,20, that is, the first pair of walls 18,18 are spaced apart a significantly smaller distance than are the second pair of walls 20,20. With this arrangement, significant deformation of the second pair of walls 20,20 does not occur, but due to the long span of the first pair of walls 18,18 these walls can be deformed by pressure exerted on the outer face thereof. That is, the first pair of walls 18,18 can be bowed inwardly under the influence of pressure to reduce the volume encompassed by the container which, of course, causes the liquid 16 to be displaced.

While a generally rectangular configuration is illustrated for the pressure-sensing portion 12, it should be understood that any variety of configurations providing at least one deformable wall is usable. Configurations not adopted for use with this invention are spherical, cylindrical or otherwise arcuate shapes since such shapes would not include the deformable wall portion necessary to reduce the volume inside the container. Accordingly, it should be understood that as used in this application, the term "generally deformable wall portion" is meant to include generally flat, planar surfaces.

The pressure-indicating portion 14 extends upwardly from the top wall 24 of the pressure-sensing portion 12 and is preferably in the form of a hollow rod closed at its upper end, as viewed in FIG. 1, and in communication with the inside of the pressure-sensing portion 12 at its lower end, as viewed in FIG. 1 of the drawing. The hollow rod provides a flow passage for the incompressible fluid when the deformable wall of the pressure-sensing portion 12 is deformed. Thus, it should be understood that the level of the incompressible fluid 16 in the hollow rod is indicative of the pressure of a medium acting on the deformable wall of the pressure-sensing portion 12. If desired, the hollow rod can include indicia or graduation marks along its length providing an indication of pressure increments. Since the incompressible fluid 16 is colored, the visual indication of pressure is facilitated.

In use, the pressure-measuring device 10 is placed in a capsule 26 which is preferably made of glass as is usual for laboratory apparatus of this type and which is adapted to be sealed, for example, by fusing a cover 28 to an open end thereof. Of course, prior to sealing the cover 28 on the capsule 26 chemical compositions to be tested or other medium, indicated generally by the reference numeral 30, are placed in the capsule. Thereafter, the pressure-measuring device 10 is placed in the capsule 26 with the pressure-sensing portion 12 preferably located in contact with the chemical compositions 30, but it should be understood that arrangements wherein the pressure-sensing portion does not contact the chemical compositions is suitable so long as it can sense the pressure within the capsule. At this point the interior of the capsule can be evacuated, depending on the type of testing being performed, and the cover 26 fused in place. If the test so requires, the capsule can be placed in an oven at an elevated temperature and periodically observed to determine the results of the test. During the time of the test, pressure increases within the capsule will deform the walls 18,18 causing them to bow inwardly, as noted previously, reducing the interior volume of the pressure-sensing portion 12. This reduction in volume, of course, displaces the incompressible fluid 16 causing it to flow into the hollow rod 14 providing an indication of the pressure of the chemical compositions.

It should be understood that the initial level of the incompressible fluid 16 within the pressure-sensing portion 12 can vary and it should be understood that the incompressible fluid can initially extend upwardly into a portion of the pressure-indicating portion 14. The level of the fluid within the pressure-measuring device is dependent on the magnitude of the pressure to be detected, the reduction in volume in the pressure-sensing portion caused by various pressures, on the expected temperatures with which the device is to be used and on various other factors. For most applications in which the pressure-measuring device 10 is used, it is desirable to calibrate it prior to its use so that the accuracy of the pressure-measuring device 10 is predetermined.

While in the foregoing, there has been described a preferred embodiment of the invention, it should be obvious to those skilled in the art that various changes and modifications can be made without departing from the true spirit and scope of the invention as recited in the appended claims:

I claim:

1. A pressure-measuring device comprising a closed glass member including a hollow pressure-sensing portion and a hollow pressure-indicating portion communicating with said pressure-sensing portion, said pressure-sensing portion being a generally rectangular container including a first pair of opposite walls having a width significantly greater than the width of a second pair of opposite walls, said container being filled with an incompressible fluid whereby when said glass member is placed in a pressurized medium said first pair of walls deform causing displacement of said incompressible fluid to provide an indication of the pressure of the medium.

2. A pressure-measuring device in accordance with claim 1 wherein said pressure-indicating portion is in the form of a hollow rod.

3. A pressure-measuring device in accordance with claim 1 wherein said pressure-indicating portion is in the form of a hollow rod closed at one end and open at the other end which communicates with a top wall of said container.

4. A pressure-measuring device in accordance with claim 1 wherein said incompressible fluid is colored.

5. A pressure-measuring device in accordance with claim 2 wherein said rod is graduated with indicia at increments of pressure.

6. A pressure-measuring device in accordance with claim 1 in combination with a sealed glass capsule in which a pressurized medium is contained, said pressure-measuring device being located in said capsule with said pressure-sensing portion being in contact with said pressurized medium.

7. A pressure-measuring device in accordance with claim 1 wherein said pressure-indicating portion is a hollow rod extending upwardly from a top wall of said pressure-sensing portion, including indicia along its length corresponding to predetermined increments of pressure, said incompressible fluid being colored.

8. A pressure-measuring device in combination with a sealed glass capsule in which a pressurized medium is contained, said pressure-measuring device comprising a closed glass member including a hollow pressure-sensing portion and a hollow pressure-indicating portion communicating with said pressure-sensing portion, said pressure-sensing portion including a deformable wall and being filled with an incompressible fluid, said pressure-measuring device being located in said capsule with said pressure-sensing portion being in contact with said pressurized medium whereby said deformable wall deforms under the influence of said pressurized medium causing displacement of said incompressible fluid to provide an indication of the pressure of said medium.

9. A pressure measuring device comprising a closed glass member including a hollow pressure-sensing portion and a hollow pressure-indicating portion communicating with said pressure-sensing portion, said pressure-sensing portion being a container including a pair of substantially planar parallel walls having a relatively long span whereby each of said first pair of walls is deformable, said container being filled with an incompressible fluid whereby when said glass member is placed in a pressurized medium, said walls deform causing displacement of said incompressible fluid to provide an indication of the pressure of the medium.

* * * * *